United States Patent
Hwang (10) Patent No.: US 9,964,341 B2
(45) Date of Patent: May 8, 2018

(54) HEAT PUMP HOT-WATER SUPPLY DEVICE AND METHOD FOR CONTROLLING A HEAT PUMP HOT-WATER SUPPLY DEVICE

(71) Applicant: LG ELECTRONICS INC., Seoul (KR)

(72) Inventor: Junhyeon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 14/876,288

(22) Filed: Oct. 6, 2015

(65) Prior Publication Data

US 2016/0216011 A1 Jul. 28, 2016

(30) Foreign Application Priority Data

Jan. 28, 2015 (KR) .......................... 10-2015-0013639

(51) Int. Cl.
*F25B 1/00* (2006.01)
*F25B 49/00* (2006.01)
(Continued)

(52) U.S. Cl.
CPC .............. *F25B 13/00* (2013.01); *F24H 4/02* (2013.01); *F24H 9/2007* (2013.01); *F25B 30/02* (2013.01);
(Continued)

(58) Field of Classification Search
CPC ........ F25B 13/00; F25B 49/022; F25B 30/02; F25B 49/02; F25B 2500/31;
(Continued)

(56) References Cited

U.S. PATENT DOCUMENTS 3,733,845 A * 5/1973 Lieberman ................ F25B 7/00
62/114
2010/0186929 A1* 7/2010 Chantant ................ F25B 9/006
165/104.21

(Continued)

FOREIGN PATENT DOCUMENTS

DE 20 2010 009 468 10/2010
EP 1394482 3/2004

(Continued)

OTHER PUBLICATIONS

Ishii, Heat Pump Device, Dec. 12, 2013, JP2013249988A, Whole Document.*

(Continued)

*Primary Examiner* — Larry Furdge
(74) *Attorney, Agent, or Firm* — KED & Associates, LLP (57) ABSTRACT

A heat pump hot-water supply device and a method for controlling a heat pump hot-water supply device are provided. The heat pump hot-water supply device may include a first refrigerant cycle, in which a first refrigerant may circulate, the first refrigerant cycle including a first compressor, an outdoor heat exchanger, and a first expansion device; a second refrigerant cycle, in which a second refrigerant may circulate, the second refrigerant cycle including a second compressor and a second expansion device; a water-refrigerant heat exchanger to which the first refrigerant compressed in the first compressor and the second refrigerant compressed in the second compressor may be introduced; a water introduction path coupled to a first side of the water-refrigerant heat exchanger and into which supplied water may be introduced; and a water discharge path coupled to a second side of the water-refrigerant heat exchanger and from which the water heat-exchanged in the refrigerant heat exchanger may be discharged.

12 Claims, 7 Drawing Sheets

(51) Int. Cl.
*F25B 13/00* (2006.01)
*F25B 49/02* (2006.01)
*F25B 30/02* (2006.01)
*F28D 9/00* (2006.01)
*F24H 4/02* (2006.01)
*F24H 9/20* (2006.01)
*F28D 21/00* (2006.01)

(52) U.S. Cl.
CPC ............ F25B 49/02 (2013.01); F25B 49/022 (2013.01); F28D 9/0093 (2013.01); *F25B 2339/047* (2013.01); *F25B 2400/0403* (2013.01); *F25B 2400/061* (2013.01); *F25B 2500/31* (2013.01); *F25B 2600/0251* (2013.01); *F25B 2600/0253* (2013.01); *F25B 2600/2501* (2013.01); *F25B 2700/2106* (2013.01); *F25B 2700/21161* (2013.01); *F25B 2700/21163* (2013.01); *F28D 2021/007* (2013.01); *Y02B 30/12* (2013.01); *Y02B 30/741* (2013.01)

(58) Field of Classification Search
CPC ...... F25B 2700/2106; F25B 2600/2501; F25B 2700/21163; F25B 2600/0251; F25B 2400/061; F25B 2400/0403; F25B 2339/047; F25B 2700/21161; F25B 2600/0253; F24H 9/2007; F24H 4/02; F28D 9/0093; F28D 2021/007
See application file for complete search history.

(56) References Cited

U.S. PATENT DOCUMENTS

| | | | |
|---|---|---|---|
| 2011/0016897 A1* | 1/2011 | Akagi | F24D 3/18 62/161 |
| 2013/0180278 A1* | 7/2013 | Yamashita | F25B 6/04 62/335 |
| 2014/0069120 A1 | 3/2014 | Takemoto et al. | |
| 2014/0165642 A1 | 6/2014 | Asari et al. | |

FOREIGN PATENT DOCUMENTS

| | | | |
|---|---|---|---|
| FR | 2934890 | | 2/2010 |
| FR | 2956477 | | 8/2011 |
| JP | S5436477 A | * | 3/1979 |
| JP | 2013249988 A | * | 12/2013 |
| KR | 10-2010-0010583 | | 8/2011 |

OTHER PUBLICATIONS

Kubokoya, Reactor Residual Heat Removal System, Mar. 17, 1979, JPS5436477A, Whole Document.*

European Search Report dated Oct. 5, 2016 issued in Application No. 15189266.8.

European Search Report dated Jun. 15, 2016.

* cited by examiner

HEAT PUMP HOT-WATER SUPPLY DEVICE AND METHOD FOR CONTROLLING A HEAT PUMP HOT-WATER SUPPLY DEVICE

CROSS-REFERENCE TO RELATED APPLICATION(S)

The present application claims priority under 35 U.S.C. 119 and 35 U.S.C. 365 to Korean Patent Application No. 10-2015-0013639, filed in Korea on Jan. 28, 2015, which is hereby incorporated by reference in its entirety.

BACKGROUND

1. Field

A heat pump hot-water supply device and a method for controlling a heat pump hot-water supply device are disclosed herein.

2. Background

In general, heat pump hot-water supply devices are devices that supply hot-water using heat pumps to supply discharge water having a high temperature or to heat indoor floors. In the heat pump, a refrigeration cycle in which a refrigerant is compressed, condensed, expanded, and evaporated may be driven.

The heat pump hot-water supply device may be used a lot when outdoor air has a relatively low temperature. Also, according to a range of temperature of the outdoor air, a desired temperature of the discharge water may vary.

For example, in winter when the temperature of the outdoor air is relatively low, a user may desire to use discharge water having a relatively high temperature. On the other hand, in spring or autumn when the temperature of the outdoor air is relatively high, the user may desire to use discharge water having a relatively low temperature. That is, a load required for the heat pump hot-water supply device may vary depending on the temperature of the outdoor air.

However, in the heat pump hot-water supply device according to a related art, as a same refrigeration cycle always operates regardless of the temperature of the outdoor air, an operation efficiency of the heat pump hot-water supply device is reduced. A prior art related to the heat pump hot-water supply device is Korean Application No. KR 10-2010-0010583, filed in Korea on Feb. 4, 2010, and entitled "heat pump heating apparatus", which is hereby incorporated by reference.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the embodiments, examples of which are illustrated in the accompanying drawings. Where possible, like reference numerals have been used to indicate like elements, and repetitive disclosure has been omitted.

Figure 1:
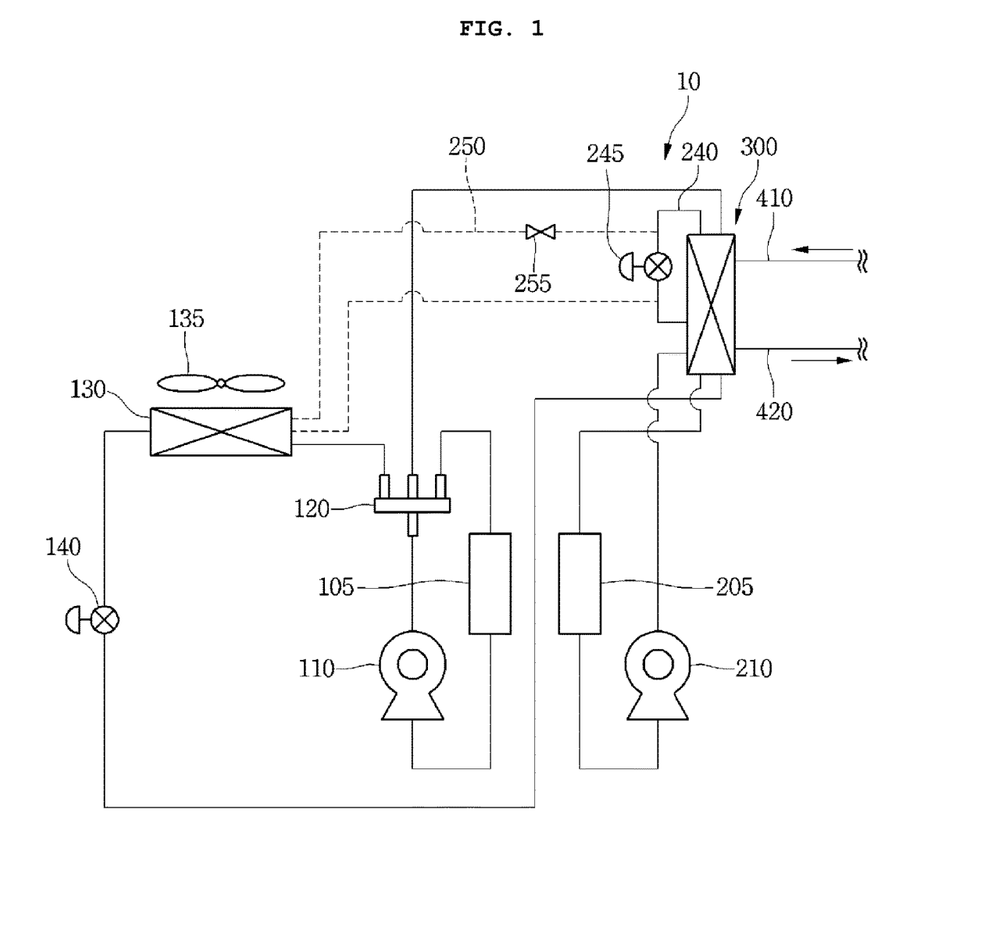
FIG. 1 is a schematic diagram of a heat pump hot-water supply device according to an embodiment.
Figure 2:
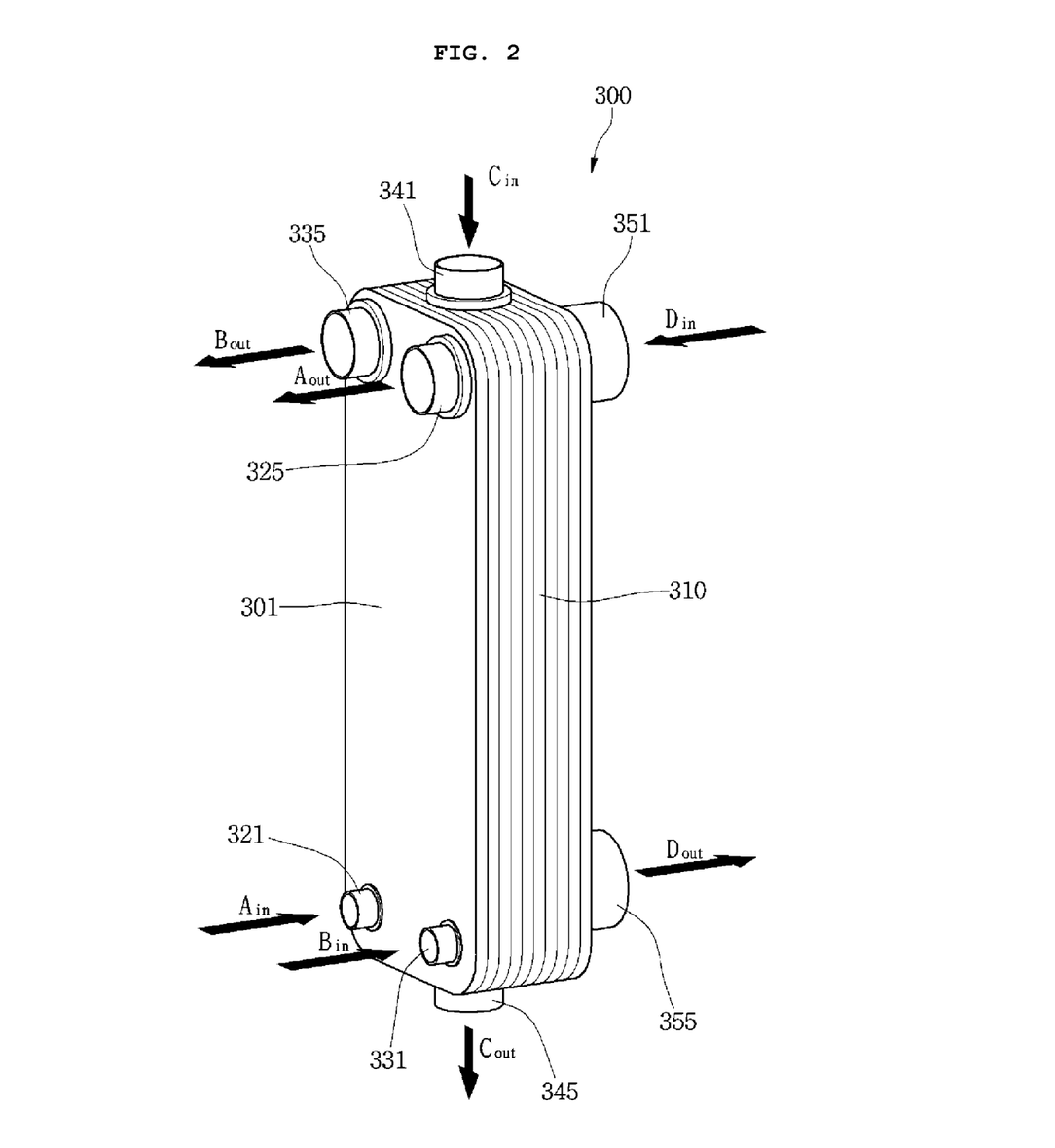
FIG. 2 is a perspective view of a water-refrigerant heat exchanger according to an embodiment.
Figure 3:
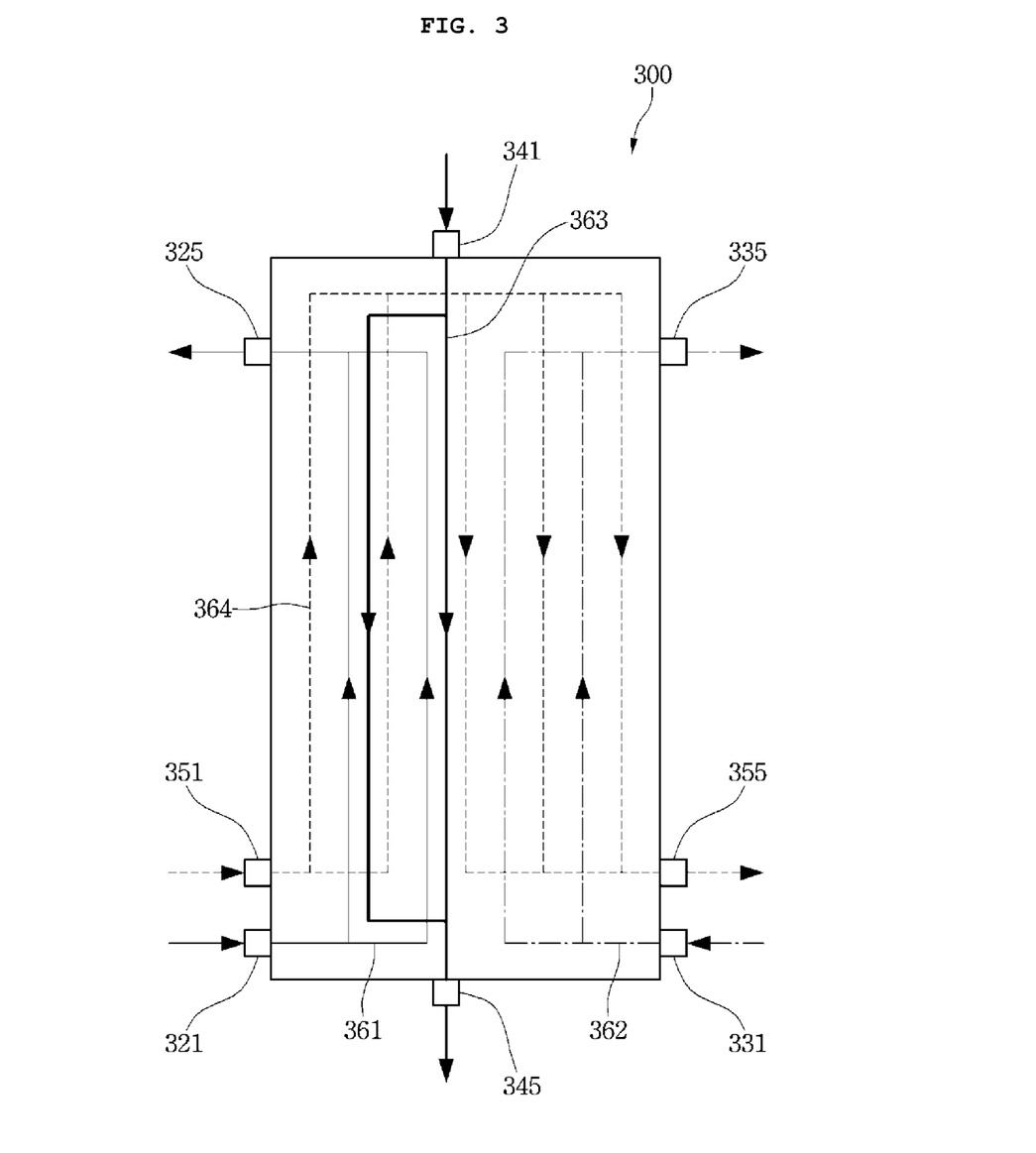
FIG. 3 is a schematic diagram illustrating an inner flow path of the water-refrigerant heat exchanger according to an embodiment.

FIG. 1 is a schematic diagram of a heat pump hot-water supply device according to an embodiment. FIG. 2 is a perspective view of a water-refrigerant heat exchanger according to an embodiment. FIG. 3 is a schematic diagram illustrating an inner flow path of the water-refrigerant heat exchanger according to an embodiment.

Referring to FIG. 1, a hot water supply device 10 according to an embodiment may include a first refrigerant cycle, in which a first refrigerant may circulate, and a second refrigerant cycle, in which a second refrigerant may circulate. The first refrigerant cycle may include a first compressor 110 that compresses the first refrigerant, an outdoor heat exchanger 130, and a flow switch 120 that guides the refrigerant compressed in the compressor 110 to the outdoor heat exchanger 130 or a water-refrigerant heat exchanger 300. The first compressor 110 may include an inverter compressor in which a frequency is adjustable.

The refrigerant compressed in the first compressor 110 may flow to the outdoor heat exchanger 130 or the water-refrigerant heat exchanger 300 according to a control state of the flow switch 120. The water-refrigerant heat exchanger 300 may be understood as one component of the first refrigerant cycle.

The first refrigerant cycle may further include a first expansion device 140 that expands the refrigerant condensed in the outdoor heat exchanger 130 or the water-refrigerant heat exchanger 300, and a first gas-liquid separator 105 provided at a suction-side of the first compressor 110 to separate a gaseous refrigerant from the refrigerant. The gaseous refrigerant separated by the first gas-liquid separator 105 may be suctioned into the first compressor 110. The first expansion device 140 may include an electronic expansion valve (EEV) which is adjustable in opening degree, for example.

In this embodiment, as a heat pump cycle is driven to supply hot-water, the first refrigerant cycle has a structure in which the refrigerant compressed in the first compressor 110 is condensed in the water-refrigerant heat exchanger 300 and expanded in the first expansion device 140 and then evaporated in the outdoor heat exchanger 130. The refrigerant evaporated in the outdoor heat exchanger 130 may be suctioned again into the first compressor 110 via the first gas-liquid separator 105. A fan 135 may be provided adjacent to the outdoor heat exchanger 130.

The second refrigerant cycle may include a second compressor 210 that compresses a second refrigerant, the water-refrigerant heat exchanger 300 that condenses and evaporates the refrigerant compressed in the second compressor 210, a second expansion device 245 that expands the refrigerant condensed in the water-refrigerant heat exchanger 300, and a second gas-liquid separator 205. The second expansion device 245 may include an EEV which is adjustable in opening degree, for example.

The refrigerant expanded in the second expansion device 245 may be introduced again into the water-refrigerant heat exchanger 300 to heat-exchange with the first and second refrigerants and water supplied thereto. That is, the second refrigerant cycle may further include a guide tube 240 that re-introduces the condensed refrigerant discharged from the water-refrigerant heat exchanger 300 to the water-refrigerant heat exchanger 300. The guide tube 240 may extend from a second outflow 335 of the water-refrigerant heat exchanger 300 and be connected to a third inflow 341. The second expansion device 245 may be disposed in the guide tube 240.

The heat pump hot-water supply device 10 may further include a water introduction path 410 connected to the water-refrigerant heat exchanger 300 to supply water, and a water discharge path 420 through which the water heat-exchanged in the water-refrigerant heat exchanger 300 may be discharged. For example, the water introduced to the water-refrigerant heat exchanger 300 through the water introduction path 410 may be heated by the first refrigerant or the second refrigerant, and then, may be discharged through the water discharge path 420.

The heat pump hot-water supply device 10 may further include a bypass tube 250 that guides the condensed second refrigerant so that the second refrigerant may be supplied to the outdoor heat exchanger 130 of the first refrigerant cycle. The bypass tube 250 may extend from an outlet-side tube from which the refrigerant condensed in the water-refrigerant heat exchanger 300 is discharged to the outdoor heat exchanger 130.

The outdoor heat exchanger 130 may include a refrigerant tube through which the first refrigerant may flow and a heat exchange fin coupled to the refrigerant tube to increase a heat exchange area. The bypass tube 250 may be provided in at least one refrigerant tube of the outdoor heat exchanger 130, for example, the bypass tube 250 may be provided to contact a lowermost refrigerant tube. Thus, the second refrigerant having a high temperature flowing through the bypass tube 250 may provide heat to the outdoor heat exchanger 130 to delay or prevent frost formation on the outdoor heat exchanger 130.

A bypass valve 255 that selectively opens and closes the bypass tube 250 may be provided in the bypass tube 250. For example, the bypass valve 255 may include a solenoid valve controlled in an on/off operation.

Figure 6A:
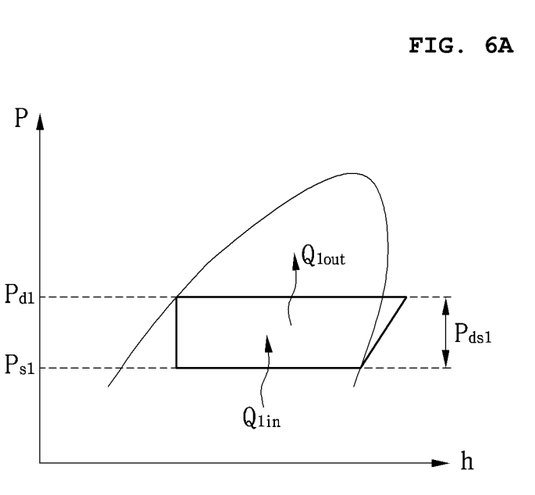
FIGS. 6A-6B are graphs of a P-H diagram of a refrigerant when the heat pump hot-water supply device operates at a medium temperature and a high temperature, respectively, according to an embodiment.
Figure 6B:
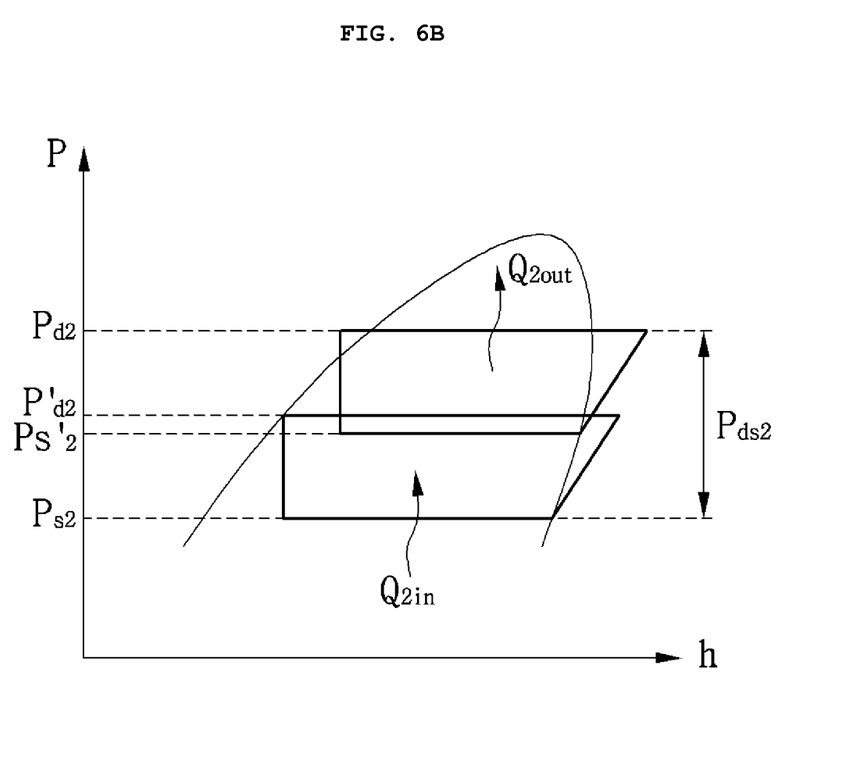

When the heat pump hot-water supply device 10 performs a high temperature operation, that is, when the first and second refrigerant cycles simultaneously operate, an operating pressure range of the first refrigerant cycle may be less than an operating pressure range of the second refrigerant cycle. For example, a low pressure of the first refrigerant cycle may be less than a low pressure of the second refrigerant cycle, and a high pressure of the first refrigerant cycle may be less than a high pressure of the second refrigerant cycle (see FIG. 6). Thus, the first refrigerant cycle may be referred to as a "low-stage cycle", and the second refrigerant cycle may be referred to as a "high-stage cycle".

A difference in operating pressure between the first and second refrigerant cycles may occur when the first and second refrigerants are different kinds of refrigerants. For example, the first refrigerant may include R410a, and the second refrigerant may include R134a.

Referring to FIGS. 2 and 3, the water-refrigerant heat exchanger 300 may include a plate heat exchanger. The water-refrigerant heat exchanger 300 may include a heat exchanger body 301, and a plurality of inflows 321, 331, 341, and 351 and a plurality of outflows 325, 335, 345, and 355 which may be coupled to the heat exchanger body 301.

The heat exchanger body 301 may include a plurality of plates 310 spaced apart from each other and stacked on each other. Each of the plurality of plates 310 may include a thin plate. A space between the plurality of plates 310 may define a flow path through which the first refrigerant, the second refrigerant, or the water may flow.

The plurality of inflows 321, 331, 341, and 351 may include a first inflow 321, to which the first refrigerant of the first refrigerant cycle may be introduced (see reference symbol $A_{in}$), and second and third refrigerant inflows 331 and 341, to which the second refrigerant of the second refrigerant cycle may be introduced. The second and third refrigerant inflows 331 and 341 may include a second inflow 331, to which the refrigerant compressed in the second compressor 210 may be introduced (see reference symbol B) and a third inflow 341, to which the refrigerant decompressed in the second expansion device 240 may be introduced (see reference symbol $C_{in}$). The plurality of inflows 321, 331, 341, and 351 may further include a fourth inflow 351 connected to the water introduction path 410 to guide introduction $D_{in}$ of the supplied water.

The plurality of outflows 325, 335, 345, and 355 may include a first outflow 325, from which the first refrigerant introduced through the first inflow 321 and heat-exchanged may be discharged (see reference symbol $A_{out}$), and second and third refrigerant outflows 335 and 345, from which the second refrigerant may be discharged. The second and third refrigerant outflows 335 and 345 may include a second outflow 335, from which the second refrigerant introduced through the second inflow 331 and heat-exchanged may be discharged (see reference symbol $B_{out}$), and a third outflow 345, from which the second refrigerant introduced through the third inflow 341 and heat-exchanged may be discharged (see reference symbol $C_{out}$). The plurality of outflows 325, 335, 345, and 355 may further include a fourth outflow 355 connected to the water discharge path 420 to guide the water heat-exchanged in the water-refrigerant heat exchanger 300 so that the water may be discharged to the water discharge path 420 (see reference symbol $D_{out}$).

The water-refrigerant heat exchanger 300 may include four flow paths heat-exchanged with each other. The four flow paths may be defined between the plurality of plates 310, which may be spaced apart from each other. The four flow paths may include a first flow path 361 that extends from the first inflow 321 to the first outflow 325 and through which the refrigerant may flow; a second flow path 362 that extends from the second inflow 331 to the second outflow 335 and through which the second refrigerant compressed in the second compressor 210 may flow; and a third flow path 363 that extends from the third inflow 341 to the third outflow 345 and through which the second refrigerant decompressed in the second expansion device 245 may flow; a fourth flow path 364 that extends from the fourth inflow 351 to the fourth outflow 355 and through which the water may flow.

As the first refrigerant flowing through the first flow path 361 may be condensed by the second refrigerant and the water, the first flow path may be referred to as a "first condensation flow path". As the second refrigerant flowing through the second flow path 362 may be condensed by the first and second refrigerant and the water, the second flow path may be referred to as a "second condensation flow path". As the second refrigerant flowing through the third flow path 363 may be evaporated by the first and second refrigerants and the water, the third flow path 363 may be referred to as an "evaporation flow path", and the fourth flow path 363 may be referred to as a "water flow path". Each of the first to fourth flow paths 361, 362, 363, and 364 may be divided into a plurality of flow paths or combined with each other.

Operations of the heat pump hot-water supply device 10 according to an embodiment will be described hereinafter.

First, in the first refrigerant cycle, the first refrigerant compressed in the first compressor 110 may be introduced to the first flow path 361 in the water-refrigerant heat exchanger 300 through the first inflow 321, and then may be heat-exchanged with the second refrigerant and water flowing through the water-refrigerant heat exchanger 300, that is, heat-exchanged with the second to fourth flow paths 362, 363, and 364, and thus, be condensed. The condensed first refrigerant may be discharged from the water-refrigerant heat exchanger 300 through the first outflow 325 and decompressed in the first expansion device 140 and then evaporated in the outdoor heat exchanger 130. The evaporated first refrigerant may be suctioned again into the first compressor 110. This cycle may be repeated.

In the second refrigerant cycle, the second refrigerant compressed in the second compressor 210 may be introduced into the second flow path 362 in the water-refrigerant heat exchanger 300 through the second inflow 331, and then, may be heat-exchanged with the first and second refrigerants and water flowing through the water-refrigerant heat exchanger 300, that is, heat-exchanged with the first, third, and fourth flow paths 361, 363, and 364, and thus, be condensed. The condensed second refrigerant may be discharged from the water-refrigerant heat exchanger 300 through the second outflow 335 and decompressed in the second expansion device 245, and then, may be introduced again into the water-refrigerant heat exchanger 300 through the third inflow 341. The introduced second refrigerant may flow through the third flow path 363 and be heat-exchanged with the first and second refrigerants and water flowing through the first, second, and fourth flow paths 361, 362, and 364, and thus, be evaporated. The evaporated second refrigerant may be suctioned into the second compressor 210. This cycle may be repeated.

When the outdoor temperature is less than a preset or predetermined temperature, frost may form on the outdoor heat exchanger 130 of the first refrigerant cycle. Thus, in this case, the bypass valve 255 may be opened. For example, an opening/closing operation of the bypass valve 255 may be controlled according to a preset or predetermined cycle. According to the opening of the bypass valve 255, at least a portion of the second refrigerant discharged from the second outflow 335 may flow to the bypass tube 250.

The bypass tube 250 may be divided from the guide tube 240 to extend to the outdoor heat exchanger 130. As the bypass tube 250 contacts the refrigerant tube forming the outdoor heat exchanger 130, heat of the bypass tube 250 may be transferred to the outdoor heat exchanger 130. Thus, the frost formation of the outdoor heat exchanger 130 may be delayed or prevented.

The supplied water to supply hot-water may be introduced into the water-refrigerant heat exchanger 300 through the water introduction path 410 and the fourth inflow 351. The introduced water may be heat-exchanged with the first and second refrigerants flowing through the first to third flow paths 361, 362, and 363, and thus, may be heated. The heated water may be discharged through the fourth outflow 355 and the water discharge path 420. The discharged water may be stored in a hot-water storage tank, for example.

Figure 4:
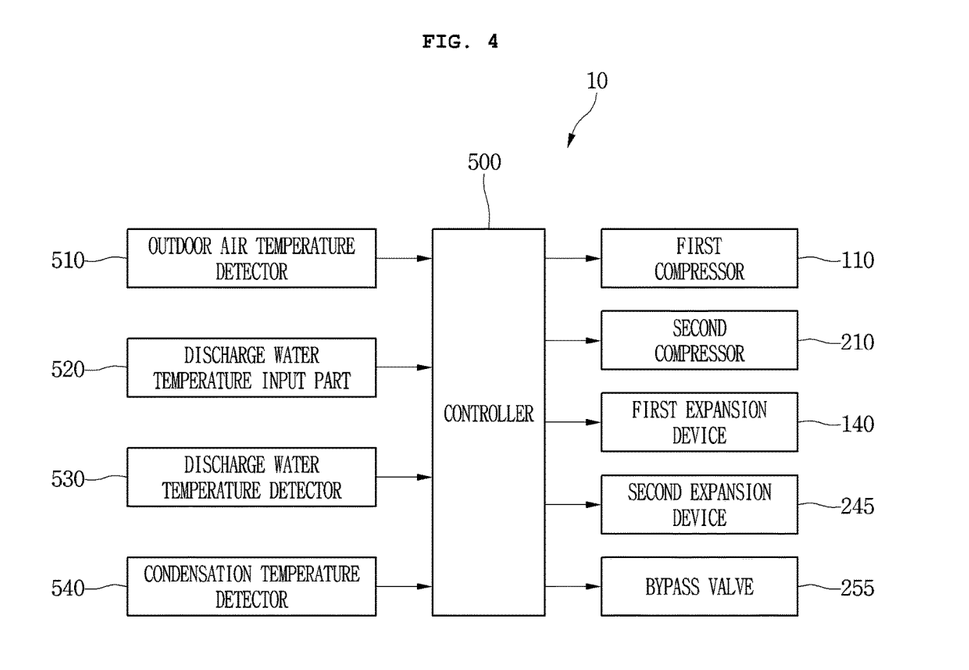
FIG. 4 is a block diagram of the heat pump hot-water supply device according to an embodiment.

FIG. 4 is a block diagram of the heat pump hot-water supply device according to an embodiment. Referring to FIG. 4, the heat pump hot-water supply device 10 according to an embodiment may include an outdoor air temperature detector 510 that detects a temperature of outdoor air and a controller 500 that determines whether the first refrigerant cycle only operates (a medium temperature operation) or whether the first and second refrigerant cycles simultaneously operate (a high temperature operation) on the basis of the outdoor air temperature recognized or detected by in the outdoor air temperature detector 510.

The heat pump hot-water supply device 10 may further include a discharge water temperature input 520 that allows a desired temperature of discharge water to be set, and a discharge water temperature detector 530 that detects a temperature of the water actually discharged. The discharge water temperature detector 530 may be provided on the fourth outflow 355 or the water discharge path 420.

The controller 500 may control a frequency of the first compressor 110 or the second compressor 210 on the basis of a preset or predetermined discharge water temperature input through the discharge water temperature input 520 and actual discharge water temperature information recognized in or detected by the discharge water temperature detector 530.

For example, when the actual discharge water temperature is less than the predetermined discharge water temperature, the controller 500 may increase the frequency of the first compressor 110 or the second compressor 210. On the other hand, when the actual discharge water temperature reaches or is greater than the predetermined discharge water temperature, the controller 500 may maintain or decrease a frequency of the first compressor 110 or the second compressor 210.

The heat pump hot-water supply device 10 may further include a condensation temperature detector 540 that detects a condensation temperature of the first refrigerant cycle. The condensation temperature detector 540 may include a temperature sensor or a pressure sensor.

For example, the temperature sensor may be provided on or at the first flow path 361, on or at a first outflow part-side to detect a temperature of the first refrigerant passing through the water-refrigerant heat exchanger 300. A pressure sensor may be provided on or at an outlet-side tube of the water-refrigerant heat exchanger 300 to detect a high pressure of the first refrigerant cycle. When the refrigerant is in a liquid state or in a two-phase state, a temperature value of the refrigerant may be determined depending on a pressure value. Thus, the pressure value detected in the pressure sensor may be converted to a condensation temperature value.

The controller 500 may determine an ability of the first refrigerant cycle on the basis of a first temperature value detected in or by the condensation temperature detector 540 and a second temperature value of the actually discharged water detected in or by the discharge water temperature detector 530. For example, while the first refrigerant cycle operates on the basis of information of the predetermined discharge water temperature and the actual discharge water temperature, when it is detected that the first temperature value is greater than the second temperature value by a preset or predetermined value, it may be recognized that the discharge water temperature is sufficiently increased by only operation of the first refrigerant cycle. Thus, the controller 500 may not command the simultaneous operations of the first and second refrigerant cycles.

On the other hand, when it is detected that the first temperature value is not greater than that the second temperature value by a preset or predetermined value, it may be recognized that the discharge water temperature is not sufficiently increased by only the operation of the first refrigerant cycle. Thus, the controller 500 may command the simultaneous operations of the first and second refrigerant cycles.

Figure 5:
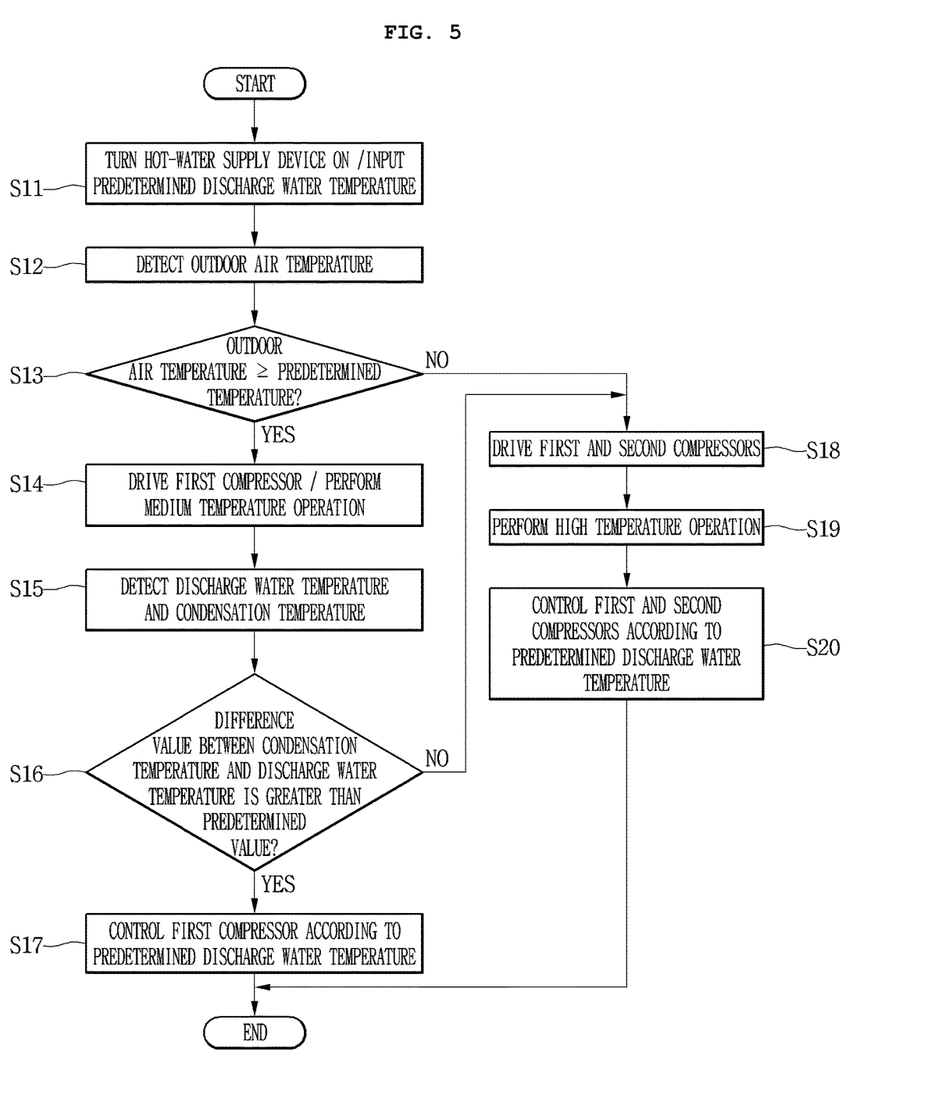
FIG. 5 is a flowchart of a method for controlling a heat pump hot-water supply device according to an embodiment.

FIG. 5 is a flowchart of a method for controlling a heat pump hot-water supply device according to an embodiment. Referring to FIG. 5, in operation S11, a heat pump hot-water supply device 10 may be turned on, and a preset or predetermined discharge water temperature may be input through a discharge water temperature input, such as discharge water temperature input 520 of FIG. 4. In operation S12, an outdoor air temperature may be detected.

In operation S12, it may be determined whether the outdoor air temperature is greater than a preset or predetermined temperature. When the outdoor air temperature is greater than the predetermined temperature, that is, when the outdoor air temperature is relatively high, it is less necessary to generate discharge water having a high temperature, and thus, a controller, such as controller 500 of FIG. 4, may control the hot-water supply device to perform a medium temperature operation.

When the hot-water supply device performs the medium temperature operation, only the first refrigerant cycle may operate. That is, a first compressor, such as first compressor 110 of FIG. 1, may be driven, and the first refrigerant compressed in the first compressor may be introduced into a first inflow, such as first inflow 321 of FIG. 2, of a water-refrigerant heat exchanger, such as, water-refrigerant heat exchanger 300 of FIG. 2.

The first refrigerant introduced into the first inflow may flow through a first flow path, such as first inflow path 361 of FIG. 3, and may be heat-exchanged with the water flowing through a fourth flow path, such as fourth flow path 364 of FIG. 3. The water may be a medium supplied through a water introduction path, such as water introduction path 410 of FIG. 1, and a fourth inflow, such as fourth inflow 351 of FIG. 2, to flow through the water-refrigerant heat exchanger.

While the first refrigerant is heat-exchanged with the water, the first refrigerant may be condensed, and the water may be heated. Also, the heated water may be discharged to the outside through a fourth outflow, such as fourth outflow 355 of FIG. 2, and a water discharge path, such as water discharge path 420 of FIG. 1.

The condensed first refrigerant may be discharged from the water-refrigerant heat exchanger through a first outflow, such as first outflow 325 of FIG. 2, and decompressed in a first expansion device, such as first expansion device 140 of FIG. 1, and then, may be evaporated in an outdoor heat exchanger, such as outdoor heat exchanger 130 of FIG. 1. The evaporated first refrigerant may be suctioned into the first compressor via a first gas-liquid separator, such as first gas-liquid separator 105 of FIG. 1. In operation S14, this first refrigerant cycle may be repeated.

In operation S15, while the first refrigerant cycle operates, a condensation temperature may be detected through or by a condensation temperature detector, such as condensation temperature detector 540 of FIG. 1, and a discharge water temperature may be detected through or by a discharge water temperature detector, such as discharge water temperature detector 530 of FIG. 1. A difference value between the condensation temperature and the discharge water temperature may be determined. The condensation temperature may be greater than the discharge water temperature. When the difference value is greater than a preset or predetermined value, as it may be recognized that the supplied water is heated only by the operation of the first refrigerant cycle, and the first refrigerant cycle may continuously operate.

The operation of the first refrigerant cycle may be performed until the discharge water temperature detected in or by the discharge water temperature detector reaches the predetermined discharge water temperature. The controller may control an operation frequency of the first compressor on the basis of the difference value between the detected discharge water temperature and the predetermined discharge water temperature.

For example, in operations S16 and S17, when the difference value is greater than a preset or predetermined difference value, an operation frequency of the first compressor may be increased to above a reference frequency. On the other hand, when the difference value is less than a preset or predetermined difference value, the operation frequency of the first compressor may be maintained at a reference frequency or may be decreased to less than the reference frequency. The reference frequency may be a frequency less than a maximum frequency of the first compressor, which is a predetermined frequency.

In operation S13, when the outdoor air temperature is less than a preset or predetermined temperature, that is, when the outdoor air temperature is relatively low, it is more necessary to generate discharge water having a high temperature, and thus, the controller may control the hot-water supply device to perform a high temperature operation.

When the hot-water supply device performs the high temperature operation, the first and second refrigerant cycles may simultaneously operate. That is, first and second compressors, such as first and second compressors 110 and 210 of FIG. 1, may be driven. Also, the first refrigerant compressed in the first compressor may be introduced into the first inflow of the water-refrigerant heat exchanger, and the second refrigerant compressed in the second compressor may be introduced into a second inflow, such as second inflow 331 of FIG. 2, of the water-refrigerant heat exchanger.

The first refrigerant introduced into the first inflow may flow through the first flow path and may be heat-exchanged with the second refrigerant and water flowing through second to fourth flow paths, such as second to fourth flow paths 362, 363, and 364 of FIG. 3. The second refrigerant introduced into the second inflow may flow through the second flow path and may be heat-exchanged with the first and second refrigerant and water flowing through the first, third, and fourth flow paths.

The second refrigerant flowing through the second flow path may be discharged from the water-refrigerant heat exchanger through a second outflow, such as second outflow 335 of FIG. 2, and expanded in a second expansion device, such as second expansion device 245 of FIG. 1, while flowing through a guide tube, such as guide tube 240 of FIG. 1. The expanded second refrigerant may be introduced into the water-refrigerant heat exchanger through a third inflow, such as third inflow 341 of FIG. 2.

The second refrigerant introduced through the third inflow part may flow through the third flow path and may be heat-exchanged with the first and second refrigerants and water flowing through the first, second, and fourth flow paths.

In the water-refrigerant heat exchanger, while the first to fourth flow paths are heat-exchanged with each other, the first refrigerant and the second refrigerant of the second flow path may be condensed, and the second refrigerant of the third flow path may be evaporated. The water may be heated and discharged to the outside through the fourth outflow and the water discharge path.

The condensed first refrigerant may be discharged from the water-refrigerant heat exchanger through the first outflow and decompressed in the first expansion device, and then, may be evaporated in the outdoor heat exchanger. The evaporated first refrigerant may be suctioned into the first compressor via the first gas-liquid separator. This first refrigerant cycle may be repeated.

Also, in operations S18 and S19, the evaporated second refrigerant may be suctioned into the second compressor via a second gas-liquid separator, such as second gas-liquid separator 205 of FIG. 1. This second refrigerant cycle may be repeated.

The operation of each of the first and second refrigerant cycles may be performed until the discharge water temperature detected in the discharge water temperature detector reaches the predetermined discharge water temperature. The controller may control an operation frequency of each of the first and second compressors on the basis of a difference value between the detected discharge water temperature and the predetermined discharge water temperature.

For example, when the difference value is greater than a preset or predetermined difference value, an operation frequency of at least one of the first and second compressors may be increased to above a reference frequency. On the other hand, when the difference value is less than a preset or predetermined difference value, the operation frequency of at least one of the first and second compressor may be maintained at a reference frequency or decreased to less than the reference frequency. The reference frequency may be a frequency less than a maximum frequency of the first compressor or the second compressor, which is a predetermined frequency.

Also, depending on a preset or predetermined cycle, the bypass valve may be opened. In operation S20, according to the opening of the bypass valve, at least a portion of the second refrigerant discharged from the second outflow to flow through the guide tube may flow to the bypass tube, and the refrigerant in the bypass tube may supply heat to the outdoor heat exchanger to delay or prevent frost formation of the outdoor heat exchanger.

In operation S16, when the difference between the condensation temperature and the discharge water temperature is less than a preset or predetermined value, it may be recognized that heating of the supplied water is restricted by only the operation of the first refrigerant cycle. Thus, an additional operation of the second refrigerant cycle, that is, high temperature operation of the hot-water supply device before the operation S18 may be performed.

As the medium temperature operation or the high temperature operation of the hot-water supply device is determined on the basis of the outdoor air temperature, and even though while the hot-water supply device operates the medium operation, the medium operation is switched to the high temperature operation on the basis of the difference value between the condensation temperature and the discharge water temperature, the hot-water supply device may be improved in operation efficiency.

FIGS. 6A-6B are graphs of a P-H diagram of a refrigerant when the heat pump hot-water supply device operates at a medium temperature and a high temperature, respectively, according to an embodiment. FIG. 6A shows a P-H diagram of the first refrigerant cycle when the heat pump hot-water supply device performs a medium temperature operation.

For example, the first refrigerant circulating in the first refrigerant cycle may be R410a. A pressure difference between a low pressure and a high pressure of the first refrigerant cycle may be $P_{ds1}$. The low pressure of the first refrigerant cycle may represent a suction pressure $P_{s1}$ of the first compressor 110, and the high pressure of the first refrigerant cycle may represent a discharge pressure $P_{d1}$ of the first compressor 110.

In consideration of a material property of R410a, it is difficult for the discharge pressure $P_{d1}$ to have a sufficiently high pressure. Also, in consideration of a compression ratio of the first compressor 110, it is difficult for the pressure difference $P_{ds1}$ to have a sufficiently high value. Thus, when the first refrigerant cycle only operates, the heat pump hot-water supply device 10 performs the medium temperature operation.

When the hot-water supply device 10 performs the medium temperature operation, it may be understood that the first refrigerant forming a low pressure of the first refrigerant cycle absorbs heat $Q_{1in}$ from the outdoor air passing through the outdoor heat exchanger 130, and the first refrigerant forming a high pressure of the first refrigerant cycle discharges heat $Q_{1out}$ to the water.

On the other hand, FIG. 6A shows a P-H diagram of the first and second refrigerant cycles when the heat pump hot-water supply device performs a high temperature operation. For example, the first refrigerant circulating in the first refrigerant cycle may be R410a, and the second refrigerant circulating in the second refrigerant cycle may be R134a.

According to the combination of the two refrigerant cycles, the heat pump hot-water supply device 10 may form a cascade system. A pressure difference between a low pressure and a high pressure of the first and second refrigerant cycles is $P_{ds2}$.

The low pressure of the first and second refrigerant cycles may represent a suction pressure $P_{s2}$ of the first compressor 110, and the high pressure of the first and second refrigerant cycles may represent a discharge pressure $P_{d2}$ of the second compressor 210.

In consideration of a material property of R134a, the discharge pressure $P_{d2}$ is greater than the discharge pressure $P_{d1}$. Also, in consideration of the combined compression ratio of the first and second compressors 110 and 210, the pressure difference $P_{ds2}$ may be greater than the pressure difference $P_{ds1}$. Thus, when the first and second refrigerant cycles simultaneously operate, the heat pump hot-water supply device 10 may perform the high temperature operation.

When the hot-water supply device 10 performs the high temperature operation, it may be understood that the first refrigerant forming the low pressure of the first and second refrigerant cycles absorbs heat $Q_{2in}$ from the outdoor air passing through the outdoor heat exchanger 130, and the second refrigerant forming the high pressure discharges heat $Q_{2out}$ to the water.

According to components and operations of the above-described heat pump hot-water supply device 10, system efficiency may be improved.

According to embodiments disclosed herein, as the medium temperature operation and the high temperature operation of the heat pump hot-water supply device is selectively performed according to the outdoor air temperature, the heat pump hot-water supply device may be improved in operation efficiency. When the outdoor air temperature is greater than the predetermined temperature, as the desired temperature of the discharge water is low, and the device has a relatively low operation load, the first compressor may be only driven to allow the first refrigerant to be heat-exchanged with the supplied water (the medium temperature operation). On the other hand, when the outdoor air temperature is less than the predetermined temperature, as the desired temperature of the discharge water is high, and the device has a relatively high operation load, the first and second compressors may be simultaneously driven to allow the first and second refrigerants to be heat-exchanged with the supplied water (the high temperature operation).

Further, when the medium temperature operation is performed, as the first compressor is only driven to operate the cycle, the cycle may be more quickly stabilized when compared to a case in which the first and second compressors are simultaneously driven. Furthermore, when the high temperature operation is performed, as the refrigerant condensed in the second refrigerant cycle is supplied to the outdoor heat exchanger of the first refrigerant cycle, frost formation of the outdoor heat exchanger may be delayed. Also, as the water-refrigerant heat exchanger may include a plate heat exchanger, heat exchange efficiency between the first and second refrigerants and the supplied water may be improved.

Embodiments disclosed herein provide a heat pump hot-water supply device having improved operation efficiency and a method for controlling a heat pump hot-water supply device.

Embodiments disclosed herein provide a heat pump hot-water supply device that may include a first refrigerant cycle, in which a first refrigerant may circulate, the first refrigerant cycle including a first compressor, an outdoor heat exchanger, and a first expansion device; a second refrigerant cycle, in which a second refrigerant may circulate, the second refrigerant cycle including a second compressor and a second expansion device; a water-refrigerant heat exchanger to which the first refrigerant compressed in the first compressor and the second refrigerant compressed in the second compressor may be introduced; a water introduction path coupled to one or a first side of the water-refrigerant heat exchanger and into which supplied water may be introduced; and a water discharge path coupled to the other or a second side of the water-refrigerant heat exchanger and from which the water heat-exchanged in the refrigerant heat exchanger may be discharged. The water-refrigerant heat exchanger may include a first inflow part or inflow that guides introduction of the first refrigerant, and a first outflow part or outflow from which the first refrigerant heat-exchanged in the water-refrigerant heat exchanger may be discharged. The water-refrigerant heat exchanger may further include a second inflow part or inflow that guides introduction of the second refrigerant compressed in the second compressor, and a second outflow part or outflow from which the second refrigerant introduced through the second inflow part and heat-exchanged may be discharged. The heat pump hot-water supply device may further include a guide tube that allows the refrigerant discharged from the second outflow part to be suctioned again into the water-refrigerant heat exchanger. The second expansion device may be disposed on the guide tube.

The water-refrigerant heat exchanger may further include a third inflow part or inflow connected to the guide tube and to which the second refrigerant may be introduced, and a third outflow part or outflow from which the third refrigerant introduced through the third inflow part and heat-exchanged may be discharged. The water-refrigerant heat exchanger may further include a fourth inflow part or inflow connected to the water introduction path to guide introduction of the supplied water, and a fourth outflow part or outflow connected to the water discharge path to allow the water introduced through the fourth inflow part and heat-exchanged to be discharged therefrom.

The heat pump hot-water supply device may further include a bypass tube divided from the guide tube to extend to the outdoor heat exchanger. The heat pump hot-water supply device may also include a bypass valve disposed in or on the bypass tube to allow the second refrigerant flowing through the guide tube to selectively flow to the outdoor heat exchanger.

The heat pump hot-water supply device may further include an outdoor air temperature detecting part or detector that detects a temperature of outdoor air. A single operation of the first refrigerant cycle or simultaneous operations of the first and second refrigerant cycles may be determined on the basis of whether the outdoor air temperature detected in the outdoor air temperature detecting part is greater than a preset or predetermined temperature. The first refrigerant cycle may have an operating pressure range that is less than that of the second refrigerant cycle. The first refrigerant may include R410a, and the second refrigerant may include R134a.

Embodiments disclosed herein further provide a method of controlling a heat pump hot-water supply device including a first refrigerant cycle in which a first compressor may be disposed and a second refrigerant cycle in which a second compressor may be disposed. The method may include turning on the heat pump hot-water supply device and inputting a preset or predetermined discharge water temperature, and recognizing whether an outdoor air temperature is greater than a preset or predetermined temperature. When the outdoor air temperature is greater than the preset temperature, the first compressor may be singly driven, and when the outdoor air temperature is less than the preset temperature, the first and second compressors may be simultaneously driven. The method may further include determining additional driving of the second compressor on the basis of a temperature of water discharged from the water-refrigerant heat exchanger and a condensed temperature of the first refrigerant cycle, while the first compressor is singly driven. The method may further include controlling a frequency of the first compressor or the second compressor on the basis of a temperature of water discharged from the water-refrigerant heat exchanger and the preset discharge water temperature.

Embodiments disclosed herein further provide a heat pump hot-water supply device that may include a first compressor in which a first refrigerant may be compressed; a second compressor in which a second refrigerant may be compressed; a water-refrigerant heat exchanger to which the refrigerant compressed in the first compressor and the refrigerant compressed in the second compressor may be introduced and in which the supplied water may be heat-exchanged with the first and second refrigerants; and a second expansion device disposed at an outlet side of the water-refrigerant heat exchanger to decompress the second refrigerant condensed in the water-refrigerant heat exchanger. The water-refrigerant heat exchanger further may include an introduction part to which the second refrigerant decompressed in the expansion device may be introduced.

The water-refrigerant heat exchanger may include a first condensation flow path through which the first refrigerant may flow; a second condensation flow path through which the second refrigerant compressed in the second compressor may flow; an evaporation flow path through which the second refrigerant decompressed in the expansion device may flow; and a water flow path through which the supplied water may flow. The water-refrigerant heat exchanger may further include an outflow part or outflow from which the second refrigerant may be discharge, and a guide tube that extends from the outflow part to the inflow part and on which the expansion device may be disposed.

The heat pump hot-water supply device may further include a first expansion device that decompresses the first refrigerant condensed in the water-refrigerant heat exchanger, and an outdoor heat exchanger that evaporates the refrigerant decompressed in the first expansion device. The heat pump hot-water supply device may further include a bypass tube divided from the guide tube to extend to the outdoor heat exchanger and disposed to contact the outdoor heat exchanger.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump hot-water supply device, comprising:
    a first refrigerant cycle, in which a first refrigerant circulates, and including a first compressor, an outdoor heat exchanger, and a first expansion device;
    a second refrigerant cycle, in which a second refrigerant circulates, and including a second compressor and a second expansion device;
    a water-refrigerant heat exchanger, to which the first refrigerant compressed in the first compressor and the second refrigerant compressed in the second compressor is introduced;
    a water introduction path coupled to a first side of the water-refrigerant heat exchanger and into which supplied water is introduced; and
    a water discharge path coupled to a second side of the water-refrigerant heat exchanger and from which the water heart-exchanged in the refrigerant heat exchanger is discharged, wherein the water-refrigerant heat exchanger includes:
        a first inflow that guides introduction of the first refrigerant compressed in the first compressor and a first outflow from which the first refrigerant introduced through the first inflow and heat-exchanged is discharged;
        a second inflow that guides introduction of the second refrigerant compressed in the second compressor and a second outflow from which the second refrigerant introduced through the second inflow and heat-exchanged is discharged, wherein the heat pump hot-water supply device further includes:
        a guide tube that allows the second refrigerant discharged from the second outflow to be re-introduced into the water-refrigerant heat exchanger;
        a bypass tube divided from the guide tube to extend to the outdoor heat exchanger; and
        a bypass valve provided in the bypass tube to allow the second refrigerant flowing through the guide tube to selectively flow to the outdoor heat exchanger.

2. The heat pump hot-water supply device according to claim 1, wherein the second expansion device is provided on the guide tube.

3. The heat pump hot-water supply device according to claim 1, wherein the water-refrigerant heat exchanger further includes:
    a third inflow connected to the guide tube and into which the second refrigerant is introduced; and
    a third outflow from which the second refrigerant re-introduced through the third inflow and heat-exchanged is discharged.

4. The heat pump hot-water supply device according to claim 3, wherein the water-refrigerant heat exchanger further includes:
    a fourth inflow connected to the water introduction path to guide introduction of the supplied water; and
    a fourth outflow connected to the water discharge path to allow the water introduced through the fourth inflow and heat-exchanged to be discharged therefrom.

5. The heat pump hot-water supply device according to claim 1, further including:
    an outdoor air temperature detector that detects a temperature of outdoor air; and
    a controller that controls operation of the first refrigerant cycle and the second refrigerant cycle, wherein the controller operates only the first refrigerant cycle or simultaneous operates the first and second refrigerant cycles on the basis of whether the outdoor air temperature detected by the outdoor air temperature detector is greater than a predetermined temperature.

6. The heat pump hot-water supply device according to claim 5, further including:
    a discharge water temperature input that receives input of a desired water temperature from a user; and
    a discharge water temperature water detector that detects an actual temperature of water discharged from the water-refrigerant heat exchanger, wherein the controller controls a frequency of the first compressor or the second compressor on the basis of an input temperature and the actual temperature.

7. The heat pump hot-water supply device according to claim 6, further including:
    a condensation temperature detector that detects a condensation temperature of the first refrigerant cycle, wherein the controller determines an ability of the first refrigerant cycle by comparing the condensation temperature detected by the condensation temperature detector to the actual temperature of water discharged from the water-refrigerant heat exchanger.

8. The heat pump hot-water supply device according to claim 1, wherein the first refrigerant cycle has an operating pressure range less than an operating pressure range of the second refrigerant cycle.

9. The heat pump hot-water supply device according to claim 1, wherein the first refrigerant includes R410a, and the second refrigerant includes R134a.

10. The heat pump hot-water supply device according to claim 1, further including a flow switch that guides the first refrigerant from the first compressor to the outdoor heat exchanger or the water-refrigerant heat exchanger according to a control state of the flow switch.

11. The heat pump hot-water supply device according to claim 1, further including a first gas-liquid separator provided at a suction-side of the first compressor to separate a gaseous refrigerant from the first refrigerant.

12. The heat pump hot-water supply device according to claim 1, further including a second gas-liquid separator to separate a gaseous refrigerant from the second refrigerant.

* * * * *